(12) United States Patent
Oh et al.

(10) Patent No.: US 10,623,732 B2
(45) Date of Patent: Apr. 14, 2020

(54) METHOD OF GENERATING RECONSTRUCTED BLOCK

(71) Applicant: INFOBRIDGE PTE. LTD., Singapore (SG)

(72) Inventors: Soo Mi Oh, Seongnam-si (KR); Moonock Yang, Singapore (SG)

(73) Assignee: INFOBRIDGE PTE. LTD., Singapore (SG)

( * ) Notice: Subject to any disclaimer, the term of this patent is extended or adjusted under 35 U.S.C. 154(b) by 125 days.

(21) Appl. No.: 16/002,904

(22) Filed: Jun. 7, 2018

(65) Prior Publication Data

US 2018/0288412 A1 Oct. 4, 2018

Related U.S. Application Data

(63) Continuation of application No. 15/332,717, filed on Oct. 24, 2016, now Pat. No. 10,015,489, which is a (Continued)

(30) Foreign Application Priority Data

Nov. 4, 2011 (KR) ........................ 10-2011-0114609

(51) Int. Cl.
*H04N 19/11* (2014.01)
*H04N 19/129* (2014.01)
(Continued)

(52) U.S. Cl.
CPC ........... *H04N 19/11* (2014.11); *H04N 19/105* (2014.11); *H04N 19/119* (2014.11);
(Continued)

(58) Field of Classification Search
CPC .... H04N 19/11; H04N 19/124; H04N 19/593; H04N 19/129; H04N 19/159;
(Continued)

(56) References Cited

U.S. PATENT DOCUMENTS

2003/0223495 A1 12/2003 Sun et al.
2007/0019726 A1 1/2007 Cha et al.
(Continued)

FOREIGN PATENT DOCUMENTS

CN 101416521 A 4/2009
CN 101536530 A 9/2009
(Continued)

OTHER PUBLICATIONS

Aoki et al., "CE4 Subtest 2: Spatial QP prediction: combination of test 2.3.g, 2.3.f and 2.3.e," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F661, pp. 1-10.
(Continued)

*Primary Examiner* — Matthew K Kwan
(74) *Attorney, Agent, or Firm* — Birch, Stewart, Kolasch & Birch, LLP

(57) ABSTRACT

An apparatus for encoding an image in intra prediction can include an intra prediction unit generating a prediction block using an intra prediction mode; a transform unit transforming residual signals generated using an original block and the prediction block to generate a transformed block; a quantization unit determining a quantization parameter and quantizing the transformed block using a quantization matrix and the quantization parameter to generate a quantized block; a scanning unit determining a scan pattern and applying the scan pattern to the quantized block to generate one-dimensional coefficient information; and an entropy coding unit entropy-coding the one-dimensional coefficient information and the intra prediction mode, in which the residual signals are transformed in a transform unit, DST-based integer transforms are used for transforming the residual signals if the size of the transform unit is smaller
(Continued)

than a predetermined size, and DCT-based transforms are used if the size of the transform unit is equal to or larger than the predetermined size, a differential quantization parameter is generated by subtracting a quantization parameter predictor from the quantization parameter, and is entropy-coded, and if two or more quantization parameters are available among a left quantization parameter, an above quantization parameter and a previous quantization parameter of a current coding unit, the quantization parameter predictor is generated using first two available quantization parameters among the left quantization parameter, the above quantization parameter and the previous quantization parameter, and if only one quantization parameter is available, the available quantization parameter is set as the quantization parameter predictor.

8 Claims, 10 Drawing Sheets

Related U.S. Application Data continuation of application No. 14/660,731, filed on Mar. 17, 2015, now Pat. No. 9,497,462, which is a continuation of application No. 14/349,465, filed as application No. PCT/CN2012/083994 on Nov. 2, 2012, now Pat. No. 9,014,262.

(51) Int. Cl.
```
H04N 19/105     (2014.01)
H04N 19/126     (2014.01)
H04N 19/44      (2014.01)
H04N 19/18      (2014.01)
H04N 19/192     (2014.01)
H04N 19/13      (2014.01)
H04N 19/124     (2014.01)
H04N 19/159     (2014.01)
H04N 19/176     (2014.01)
H04N 19/61      (2014.01)
H04N 19/463     (2014.01)
H04N 19/593     (2014.01)
H04N 19/119     (2014.01)
```

(52) U.S. Cl.
CPC ......... *H04N 19/124* (2014.11); *H04N 19/126* (2014.11); *H04N 19/129* (2014.11); *H04N 19/13* (2014.11); *H04N 19/159* (2014.11); *H04N 19/176* (2014.11); *H04N 19/18* (2014.11); *H04N 19/192* (2014.11); *H04N 19/44* (2014.11); *H04N 19/463* (2014.11); *H04N 19/593* (2014.11); *H04N 19/61* (2014.11)

(58) Field of Classification Search
CPC .... H04N 19/176; H04N 19/61; H04N 19/463; H04N 19/105; H04N 19/119; H04N 19/126; H04N 19/44; H04N 19/192; H04N 19/18; H04N 19/13
USPC ..................................................... 375/240.03
See application file for complete search history.

(56) References Cited

U.S. PATENT DOCUMENTS

| | | |
|---|---|---|
| 2007/0223021 A1 | 9/2007 | Song |
| 2008/0107181 A1 | 5/2008 | Han et al. |
| 2008/0232471 A1 | 9/2008 | Mittal et al. |
| 2009/0213930 A1 | 8/2009 | Ye et al. |
| 2009/0252221 A1 | 10/2009 | Park et al. |
| 2009/0296808 A1* | 12/2009 | Regunathan ......... H04N 19/124 375/E7.139 |
| 2010/0086029 A1* | 4/2010 | Chen .................... H04N 19/176 375/240.12 |
| 2010/0290527 A1 | 11/2010 | Park et al. |
| 2011/0038414 A1 | 2/2011 | Song et al. |
| 2011/0170790 A1 | 7/2011 | Cheon et al. |
| 2011/0292994 A1 | 12/2011 | Lim et al. |
| 2012/0008675 A1* | 1/2012 | Karczewicz ......... H04N 19/159 375/240.02 |
| 2012/0082212 A1 | 4/2012 | Sadafale et al. |
| 2012/0230403 A1 | 9/2012 | Liu et al. |
| 2012/0230417 A1 | 9/2012 | Sole Rojals et al. |
| 2012/0314766 A1 | 12/2012 | Chien et al. |
| 2013/0266064 A1 | 10/2013 | Zhang et al. |

FOREIGN PATENT DOCUMENTS

| | | |
|---|---|---|
| WO | WO 2013/037489 A1 | 3/2013 |
| WO | WO 2013/039676 A1 | 3/2013 |
| WO | WO 2013/051903 A1 | 4/2013 |
| WO | WO 2013/064094 A1 | 5/2013 |
| WO | WO 2013/064095 A1 | 5/2013 |
| WO | WO 2013/064098 A1 | 5/2013 |
| WO | WO 2013/064100 A1 | 5/2013 |

OTHER PUBLICATIONS

Auyeung et al., "Intra Coding with Directional DCT and Directional DWT," Joint Collaborative Team on Video Coding (JCT-VC) of ITU-T SG16 WP3 and ISO/IEC JTC1/SC29/WG11, 2nd Meeting, Geneva, CH, Jul. 21-28, 2010, Document: JCTVC-B107, pp. 1-28.
Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, Document: JCTVC-I1003_d9, pp. 1-260 (280 pages total).
Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F803_d6, pp. 1-217 (229 pages total).
Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11 N12186, 6th Meeting: Torino, IT, Jul. 14-22, 2011, Document: JCTVC-F803_d6, pp. 1-216 (230 pages total), XP30018681.
Chen, "BoG report on intra mode coding with fixed number of MPM candidates," Joint Collaborative Team on Video Coding (JCT-VC) of ITU-T SG16 WP3 and ISO/IEC JTC1/SC29/WG11, 6th Meeting: Torino, Jul. 14-22, 2011, Document: JCTVC-F765, pp. 1-3.
Chien et al., "Parsing friendly intra mode coding," Joint Collaborative Team on Video Coding (JCT-VC) of ITU-T SG16 WP3 and ISO/IEC JTC1/SC29/VVG11, 6th Meeting: Torino, IT, Jul. 14-22, 2011, Document: JCTVC-F459, pp. 1-5.
Chono et al., "Efficient binary representation of cu_qp_delta syntax for CABAC," Joint Collaborative Team on Video Coding (JCT-VC) of ITU-T SG16 WP3 and ISO/IEC JTC1/SC29/WG11, 6th Meeting: Torino, Jul. 14-22, 2011, Document: JCTVC-F046-r1, pp. 1-10.
International Search Report for PCT/CN2012/083994 filed on Nov. 2, 2012.
Joel Sole et al., "CE11: Unified scans for the significance map and coefficient level coding in high efficiency", Joint Collaborative Team on Video Coding (JCT-VC) of ITU-T SG16 WP3 and ISO/IEC JTC1/SC29/WG11 6th Meeting, Jul. 14-22, 2011, pp. 2-10, JCTVC-F288.
Kazushi Sato, "CE4: Result of Combination 2.3.g.+2.3.e", Joint Collaborative Team on Video Coding (JCT-VC) of ITU-T SG16 WP3 and ISO/IEC JTC1/SC29/WG11 6th Meeting, Jul. 14-22, 2011, pp. 2-5, JCTVC-F648.

(56) References Cited

OTHER PUBLICATIONS

Kondo et al., "Improvement of delta-QP Coding", Joint Collaborative Team on Video Coding (JCT-VC) of ITU-T SG16 WP3 and ISO/IEC JTC1/SC29/WG11, 6th Meeting, Jul. 14-22, 2011, JCTVC-F422rl (JCTVC-422), pp. 1-8.

Nakamura et al., "Non-CE4: Compatible QP prediction with RC and AQ," Joint Collaborative Team on Video Coding (JCT-VC) of ITU-T SG16 WP3 and ISO/IEC JTC1/SC29/WG11, 8th Meeting: San José, CA, USA, Feb. 1-10, 2012, Document: JCTVC-H0204, pp. 1-15.

Sato, "CE4: Result of Combination 2.3.g + 2.3.e," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F648, pp. 1-4.

Toru Kumakura et al., "Fixing the number of mpm candidates", Joint Collaborative Team on Video Coding (JCT-VC) of ITU-T SG16 WP3 and ISO/IEC JTC1/SC29/WG11 6th Meeting, Jul. 14-22, 2011, pp. 2-9, JCTVC-F340.

Toru Kumakura et al., "Intra prediction mode coding based on direction difference", Joint Collaborative Team on Video Coding (JCT-VC) of ITU-T SG16 WP3 and ISO/IEC JTC1/SC29/WG11 6th Meeting, Jul. 14-22, 2011, pp. 2-14, JCTVC-F339.

Tzu-Der Chuang et al., "Luma Intra Prediction Mode Coding", Joint Collaborative Team on Video Coding JCT-VC) of ITU-T SG16 WP3 and ISO/IEC JTC1/SC29/WG11 6th Meeting, Jul. 14-22, 2011, pp. 2-6, JCTVC-F062.

Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E603, 215 pages.

Yunfei Zheng et al., "CE11: Mode Dependent Coefficient Scanning", Joint Collaborative Team on Video Coding (JCT-VC) of ITU-T SG16 WP3 and ISO/IEC JTC1/SC29/WG11 4th Meeting, Jan. 20-28, 2011, pp. 2-6, JCTVC-D393.

Zhang et al., "Method for deriving Chroma QP from Luma QP," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F277, pp. 1-6.

Zou et al., "Planar Mode Binarization for Intra Mode Coding", Joint Collaborative Team on Video Coding (JCT-VC) of ITU-T SG16 WP3 and ISO/IEC JTC1/SC29/WG11, Document: JCTVC-F190, 6th Meeting: Torino, IT, Jul. 14-22, 2011, 3 pages.

\* cited by examiner

METHOD OF GENERATING RECONSTRUCTED BLOCK

CROSS-REFERENCE TO RELATED APPLICATIONS

This Application is a Continuation of U.S. Parent application Ser. No. 15/332,717 filed on Oct. 24, 2016, which is a Continuation of U.S. patent application Ser. No. 14/660,731 filed on Mar. 17, 2015 (now U.S. Pat. No. 9,497,462 issued Nov. 15, 2016), which is a Continuation of U.S. patent application Ser. No. 14/349,465 filed on Apr. 3, 2014 (now U.S. Pat. No. 9,014,262 issued Apr. 21, 2015), which was filed as the National Phase of PCT/CN2012/083994 filed on Nov. 2, 2012, which claims the benefit under 35 U.S.C. § 119(a) to Korean Patent Application No. 10-2011-0114609 filed on Nov. 4, 2011, all of which are hereby expressly incorporated by reference into the present application.

BACKGROUND OF THE INVENTION

The present invention relates to a method and an apparatus of decoding an image, and more particularly, to a method and apparatus of adaptively generating a prediction block and residual block having equal size to a transform unit according to an intra prediction mode.

In H.264/MPEG-4 AVC, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficient of the quantized block are scanned by a predetermined scan type and then entropy-coded. The quantization parameter is adjusted per macroblock and encoded using a previous quantization parameter.

Meanwhile, techniques using various size of coding unit are introduced to improve the coding efficiency. Techniques increasing a number of intra prediction modes are also introduces to generate a prediction block more similar to an original block.

But, if the number of intra prediction modes increases, the amount of coding bits required for signaling the intra prediction mode becomes larger. Also, if the size of the coding unit is larger, the difference between an original block and a prediction block prediction block is greater.

Accordingly, more effective method is required to signal the intra prediction mode. More effective method is also required to minimize the difference between the original block and the prediction block and to minimize the coding bits of residual block.

SUMMARY OF THE INVENTION

The present invention is directed to a method of deriving an intra prediction mode of a prediction unit, determining a size of a current block using transform size information, generating a prediction block and a residual block of the current block according to the intra prediction mode and generating a reconstructed block of the current block using the prediction block and the residual block.

One aspect of the present invention provides a method of generating a reconstructed block, comprising deriving an intra prediction mode of a prediction unit, determining a size of a current block using transform size information, generating a prediction block of the current block according to the intra prediction mode, generating a residual block of the current block according to the intra prediction mode and generating a reconstructed block of the current block using the prediction block and the residual block.

A method according to the present invention derives an intra prediction mode of a prediction unit, determines a size of a current block using transform size information, generates a prediction block of the current block according to the intra prediction mode, generating a residual block of the current block according to the intra prediction mode and generating a reconstructed block of the current block using the prediction block and the residual block. The sizes of the prediction block and the residual block are set equal to a size of a transform unit. Therefore, the distance of intra prediction becomes short, and the amount of coding bits of residual block is reduced by generating a prediction block very similar to original block. Also, the signaling bits required to signal intra prediction mode decrease by generating MPM group adaptively according to the neighboring intra prediction modes.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
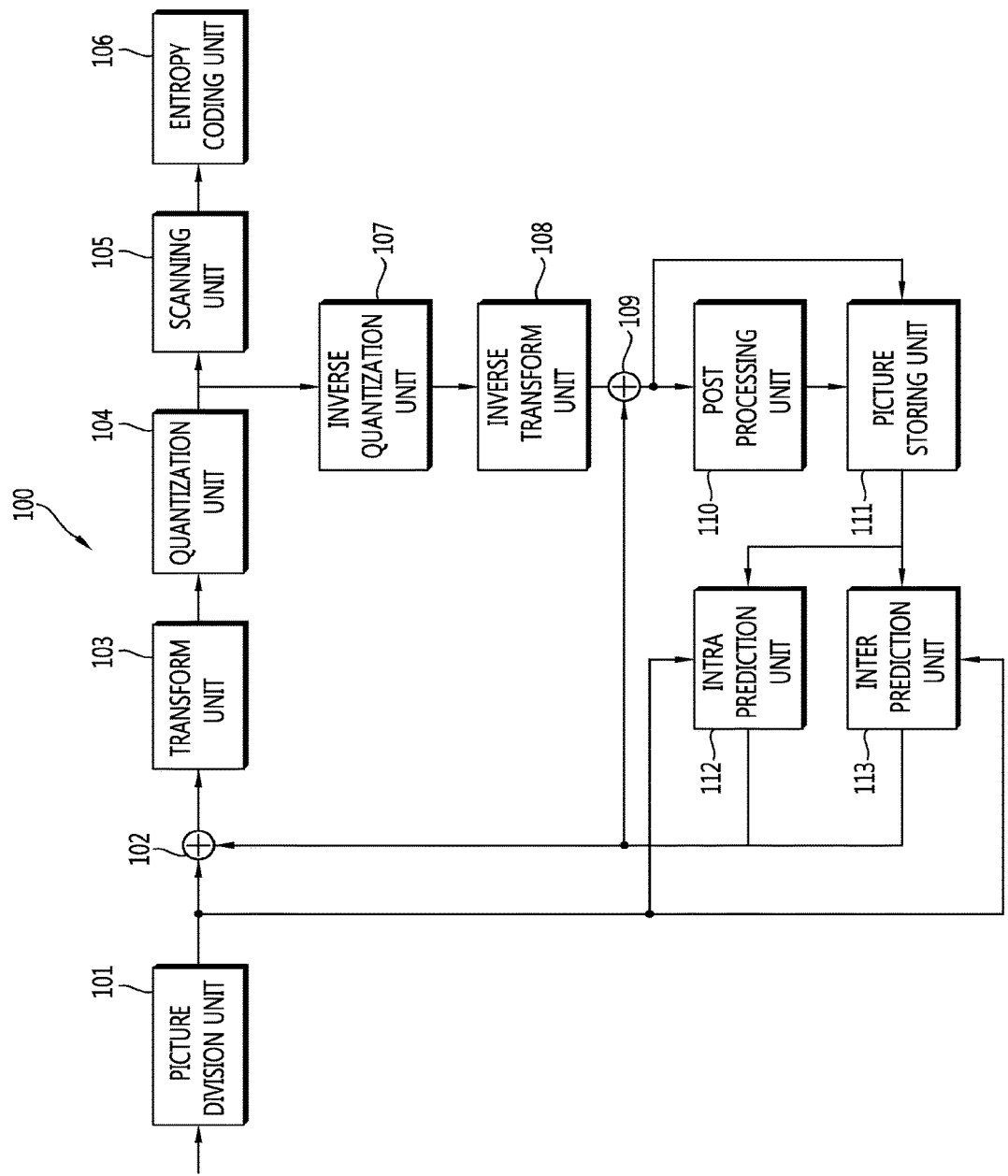
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 101, a transform unit 103, a quantization unit 104, a scanning unit 105, an entropy coding unit 106, an inverse quantization unit 107, an inverse transform unit 108 a post-processing unit 110, a picture storing unit 111, an intra prediction unit 112, an inter prediction unit 113, a subtracter 102 and an adder 109.

The picture division unit 101 divides a picture or a slice into a plurality of largest coding units (LCUs), and divides each LCU into one or more coding units. The picture division unit 101 determines prediction mode of each coding unit and a size of prediction unit and a size of transform unit.

An LCU includes one or more coding units. The LCU has a recursive quad tree structure to specify, a division structure. Information specifying the maximum size and the minimum size of the coding unit is included in a sequence parameter set. The division structure is specified by one or more split coding unit flags (split_cu_flags). The coding unit has a size of 2N×2N.

A coding unit includes one or more prediction units. In intra prediction, the size of the prediction unit is 2N×2N or N×N. In inter prediction, the size of the prediction, unit is 2N×2N, 2N×N, N×2N or N×N. When the prediction unit is an asymmetric partition in inter prediction, the size of the prediction unit may also be one of hN×2N, (2–h)N×2N, 2N×hN and 2N×(2–h)N. The value of h is ½.

A coding unit includes one or more transform units. The transform unit has a recursive quad tree structure to specify a division structure. The division structure is specified by one or more split transform unit flags (split_to_flags). Information specifying the maximum size and the minimum size of the transform unit is included in a sequence parameter set.

The intra prediction unit 112 determines an intra prediction mode of a current prediction unit and generates a prediction block using the intra prediction mode. The prediction block has the same size of the transform unit.

The inter prediction unit 113 determines motion information of the current prediction unit using one or more reference pictures stored in the picture storing unit 111, and generates a prediction block of the prediction unit. The motion information includes one or more reference picture indexes and one or more motion vectors.

The transform unit 103 transforms residual signals generated using an original block and a prediction block to generate a transformed block. The residual signals are transformed in transform units. A transform type is determined by the prediction mode and the size of the transform unit. The transform type is a DCT-based integer transform or a DST-based integer transform. For example, inter prediction, DCT-based integer transforms are used. In intra prediction mode, if the size of the transform unit is smaller than a predetermined size, the DST-based integer transforms are used, otherwise the DCT-based integer transforms are used.

The quantization unit 104 determines a quantization parameter for quantizing the transformed block. The quantization parameter is a quantization step size. The quantization parameter is determined per quantization unit. The size of the quantization unit is one of allowable sizes of coding unit. If a size of the coding unit is equal to or larger than the minimum size of the quantization unit, the coding unit becomes the quantization unit. A plurality of coding units may be included in a quantization unit. The minimum size of the quantization unit is determined per picture and information specifying the minimum size of the quantization unit is included in a picture parameter set.

The quantization unit 104 generates a quantization parameter predictor and generates a differential quantization parameter by subtracting the quantization parameter predictor from the quantization parameter. The differential quantization parameter is entropy coded and included in coding unit syntax.

The quantization parameter predictor is generated by using quantization parameters of neighboring coding units and a quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor. The average is rounded off.

The quantization unit 104 quantizes the transformed block using a quantization matrix and the quantization parameter to generate a quantized block. The quantized block is provided to the inverse quantization unit 107 and the scanning unit 105.

The scanning unit 105 determines a scan pattern and applies the scan pattern to the quantized block. When CABAC (Context adaptive binary arithmetic coding) is used for entropy coding, the scan pattern is determined as follows.

In intra prediction, the scan pattern is determined by the intra prediction mode and the size of the transform unit. The size of the transform unit, the size of transformed block and the size of the quantized block are same. The scan pattern is selected among a diagonal scan, vertical scan and horizontal scan. The quantized transform coefficients of the quantized block are split into significant flags, coefficient signs and coefficient levels. The scan pattern is applied to the significant flags, coefficient signs and coefficient levels respectively. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

When the size of the transform unit is equal to or smaller than a first size, the horizontal scan is selected for the vertical mode and a predetermined number of neighboring intra prediction modes of the vertical mode in directionality, the vertical scan is selected for the horizontal mode and the predetermined number of neighboring intra prediction modes of the horizontal mode in directionality, and the diagonal scan is selected for the other intra prediction modes. When the size of the transform unit is larger than the first size, the diagonal scan is used. The first size is 8×8.

In inter prediction, a predetermined scan pattern is used regardless of the size of the transform unit. The predetermined scan pattern is the diagonal scan when the CABAC is used fir entropy coding.

When the size of the transform unit is larger than a second size, the quantized block is divided into a main subset and a plurality of remaining subsets and the determined scan pattern is applied to each subset. Significant flags, coefficient signs and coefficients levels of each subset are scanned respectively according to the determined scan pattern. The main subset includes DC coefficient and the remaining subsets covers the region other than the region covered by the main subset. The second size is 4×4. A size of the subset may be 4×4 block or may vary according to the scan pattern. The subset contains 16 transform coefficients.

The scan pattern for scanning the subsets is the same as the scan pattern for scanning quantized transform coefficients of each subset. The quantized transform coefficients of each subset are scanned in the reverse direction. The subsets are also scanned in the reverse direction.

Last non-zero coefficient position is encoded and transmitted to the decoder. The last non-zero coefficient position specifies a position of last non-zero quantized transform coefficient within the transform unit. Non-zero subset flag is set for each subset other than the main subset and the last subset. The last subset covers the last non-zero coefficient. The non-zero subset flag indicates whether the subset contains non-zero coefficients or not.

The inverse quantization unit 107 inversely quantizes the quantized transform coefficients of the quantized block.

The inverse transform unit 108 inversely transforms the inverse quantized block to generate residual signals of the spatial domain.

The adder 109 generates a reconstructed block by adding the residual block and the prediction block.

The post-processing unit 110 performs a deblocking filtering process for removing blocking artifact generated in a reconstructed picture.

The picture storing unit 111 receives post-processed image from the post-processing unit 110, and stores the image in picture units. A picture may be a frame or a field.

The entropy coding unit 106 entropy-codes the one-dimensional coefficient information received from the scanning unit 105, intra prediction information received from the intra prediction unit 112, motion information received from the inter prediction unit 113, and so on.

Figure 2:
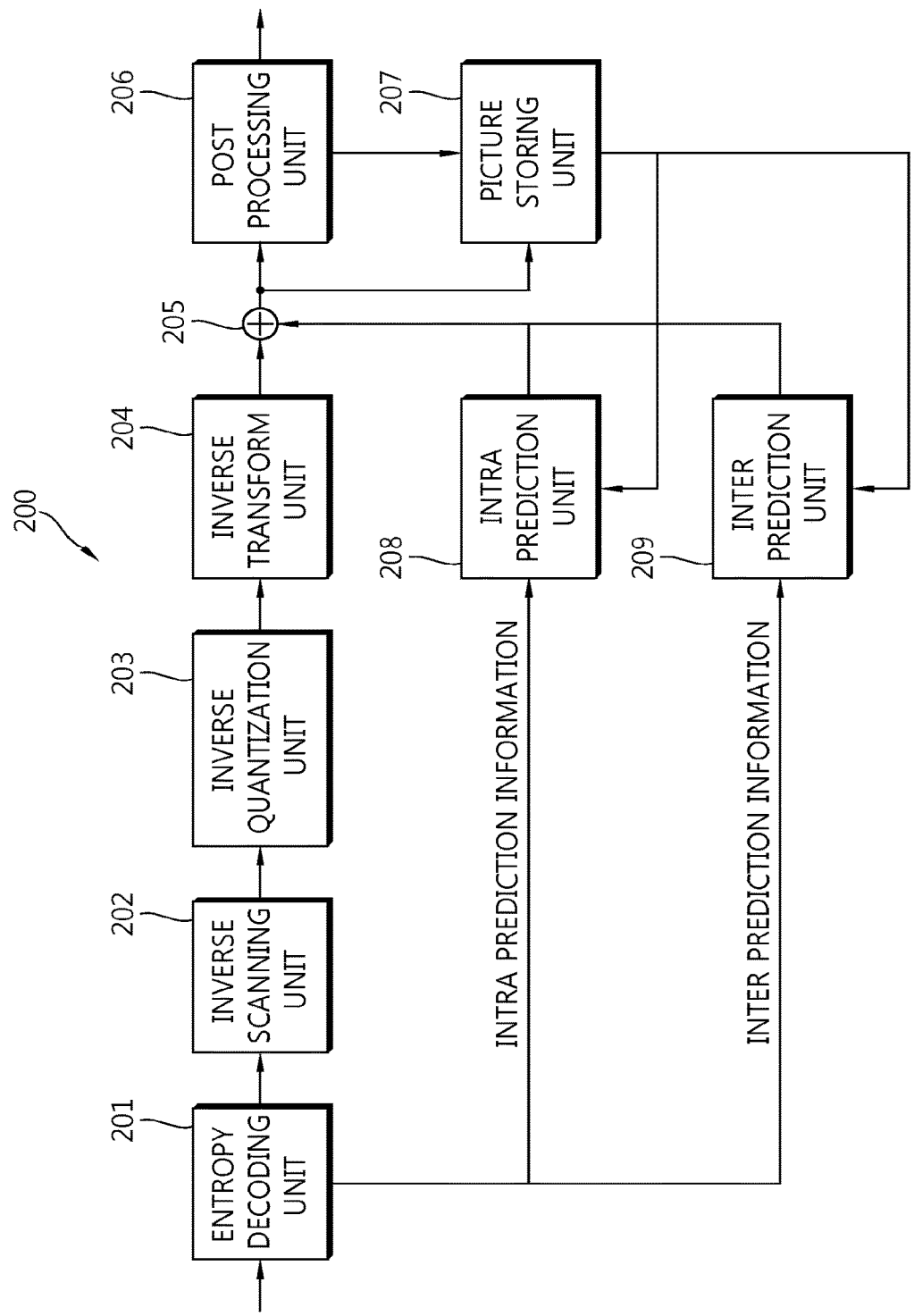
FIG. 2 is a block diagram of an image decoding apparatus according to the present invention.

FIG. 2 is a block diagram of an image decoding apparatus 200 according to the present invention.

The image decoding apparatus 200 according to the present invention includes an entropy decoding unit 201, an inverse scanning unit 202, an inverse quantization unit 203, an inverse transform unit 204, an adder 205, a post processing unit 206, a picture storing unit 207, an intra prediction unit 208 and an inter prediction unit 209.

The entropy decoding unit 201 extracts the intra prediction information, the inter prediction information and the one-dimensional coefficient information from a received bit stream. The entropy decoding unit 201 transmits the inter prediction information to the inter prediction unit 209, the intra prediction information to the intra prediction unit 208 and the coefficient information to the inverse scanning unit 202.

The inverse scanning unit 202 uses an inverse scan pattern to generate quantized block. When CABAC is used for entropy coding, the scan pattern is determined as follows.

In intra prediction, the inverse scan pattern is determined by the intra prediction mode and the size of the transform unit. The inverse scan pattern is selected among a diagonal scan, vertical scan and horizontal scan. The selected inverse scan pattern is applied to significant flags, coefficient signs and coefficients levels respectively to generate the quantized block.

When the size of the transform unit is equal to or smaller than a first size, the horizontal scan is selected for the vertical mode and a predetermined number of neighboring intra prediction modes of to the vertical mode, the vertical scan is selected for the horizontal mode and the predetermined number of neighboring intra prediction modes of the horizontal mode, and the diagonal scan is selected for the other intra prediction modes. When the size of the transform unit is larger than the first size, the diagonal scan is used. When the size of the transform unit is larger than the first size, the diagonal scan is selected for all intra prediction modes. The first size is 8×8.

When the size of the transform unit is larger than the first size, the diagonal scan is selected for all intra prediction modes.

In inter prediction, the diagonal scan is used.

When the size of the transform unit is larger than the second size, the significant flags, the coefficient signs and the coefficients levels are inversely scanned in the unit of subset using the determined inverse scan pattern to generate subsets, and the subsets are inversely scanned to generate the quantized block. The second size is 4×4. The size of the subset may be 4×4 block or a non-square block determined by the scan pattern. The non-square block includes 16 transform coefficients. For example, the size of the subset is 8×2 for the horizontal scan, 2×8 for the vertical scan and 4×4 for the diagonal scan.

The inverse scan pattern used for generating each subset is the same as the inverse scan pattern used for generating the quantized block. The significant flags, the coefficient signs and the coefficient levels are inversely scanned in the reverse direction. The subsets are also inversely scanned in the reverse direction.

The last non-zero coefficient position and the non-zero subset flags are received from the encoder. The number of encoded subsets is determined according to the last non-zero coefficient position and the inverse scan pattern. The non-zero subset flags are used to select subsets to be generated. The main subset and the last subset are generated using the inverse scan pattern.

The inverse quantization unit 203 receives the differential quantization parameter from the entropy decoding unit 201 and generates the quantization parameter predictor. The quantization parameter predictor is generated through the same operation of the quantization unit 104 of FIG. 1. Then, the inverse quantization unit 203 adds the differential quantization parameter and the quantization parameter predictor to generate the quantization parameter of the current coding unit, if the size of the current coding unit is equal to or larger than the minimum size of the quantization unit and the differential quantization parameter for the current coding unit is not received from the encoder, the differential quantization parameter is set to 0.

The inverse quantization unit 203 inversely quantizes the quantized block.

The inverse transform unit 204 inversely transforms the inverse-quantized block to restore a residual block. The inverse transform type is adaptively determined according to the prediction mode and the size of the transform unit. The inverse transform type is the DCT-based integer transform or the DST-based integer transform. For example, inter prediction, DCT-based integer transforms are used. in intra prediction mode, if the size of the transform unit is smaller than a predetermined size, the DST-based integer transforms are used, otherwise the DCT-based integer transforms are used.

The intra prediction unit 208 restores the intra prediction mode of the current prediction unit using the received intra prediction information, and generates a prediction block according to the restored intra prediction mode.

The inter prediction unit 209 restores the motion information of the current prediction unit using the received inter prediction information, and generates a prediction block using the motion information.

The post-processing unit 206 operates the same as the post-processing unit 110 of FIG. 1.

The picture storing unit 207 receives post-processed image from the post-processing unit 206, and stores the image in picture units. A picture may be a frame or a field.

The adder 205 adds the restored residual block and a prediction block to generate a reconstructed block.

Figure 3:
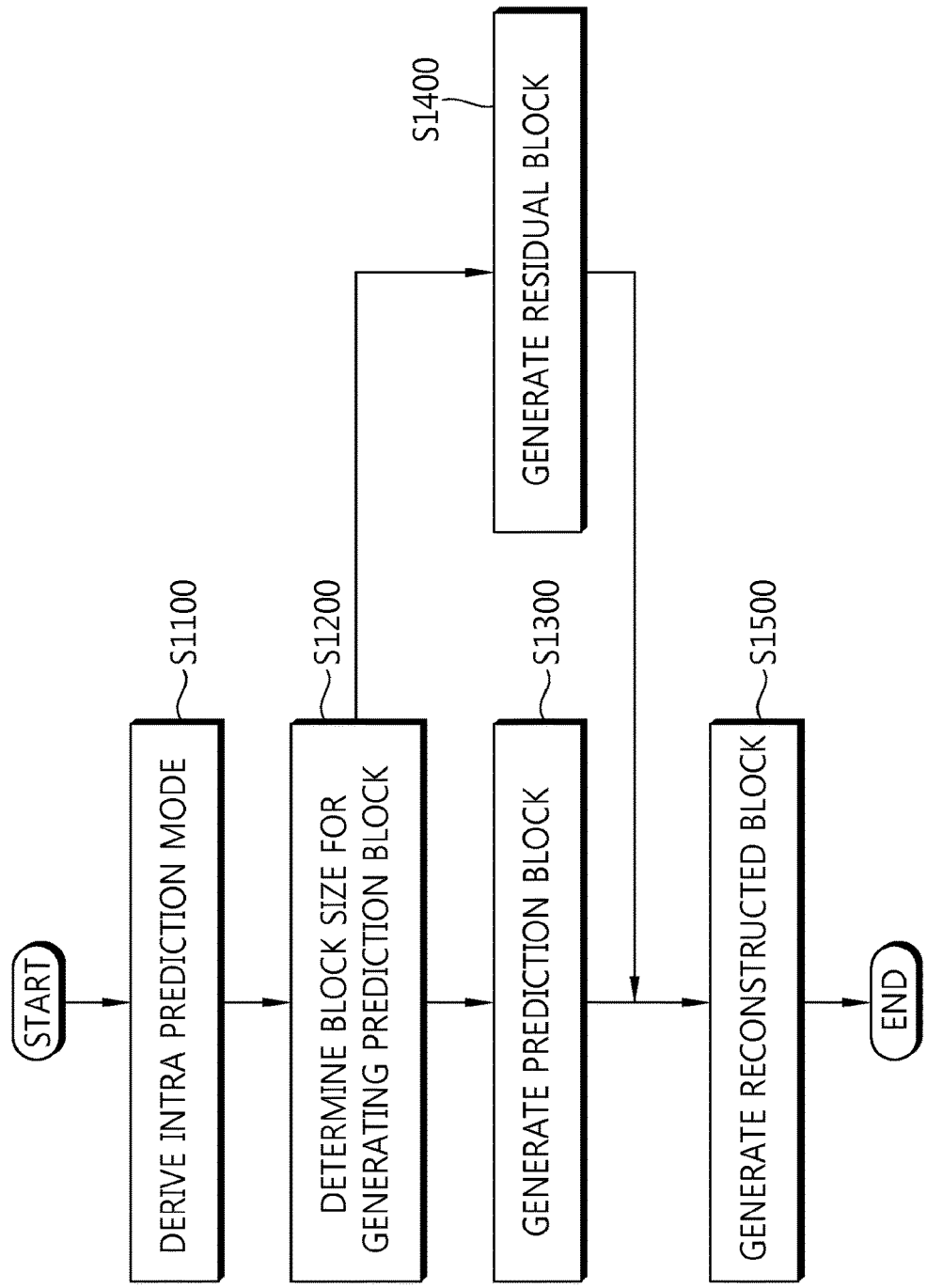
FIG. 3 is a flow chart illustrating a procedure of generating a reconstructed block in intra prediction according to the present invention.

FIG. 3 is a flow chart illustrating a procedure of generating a reconstructed block in intra prediction according to the present invention.

First, an intra prediction mode of a current prediction unit is derived (S1100).

Figure 4:
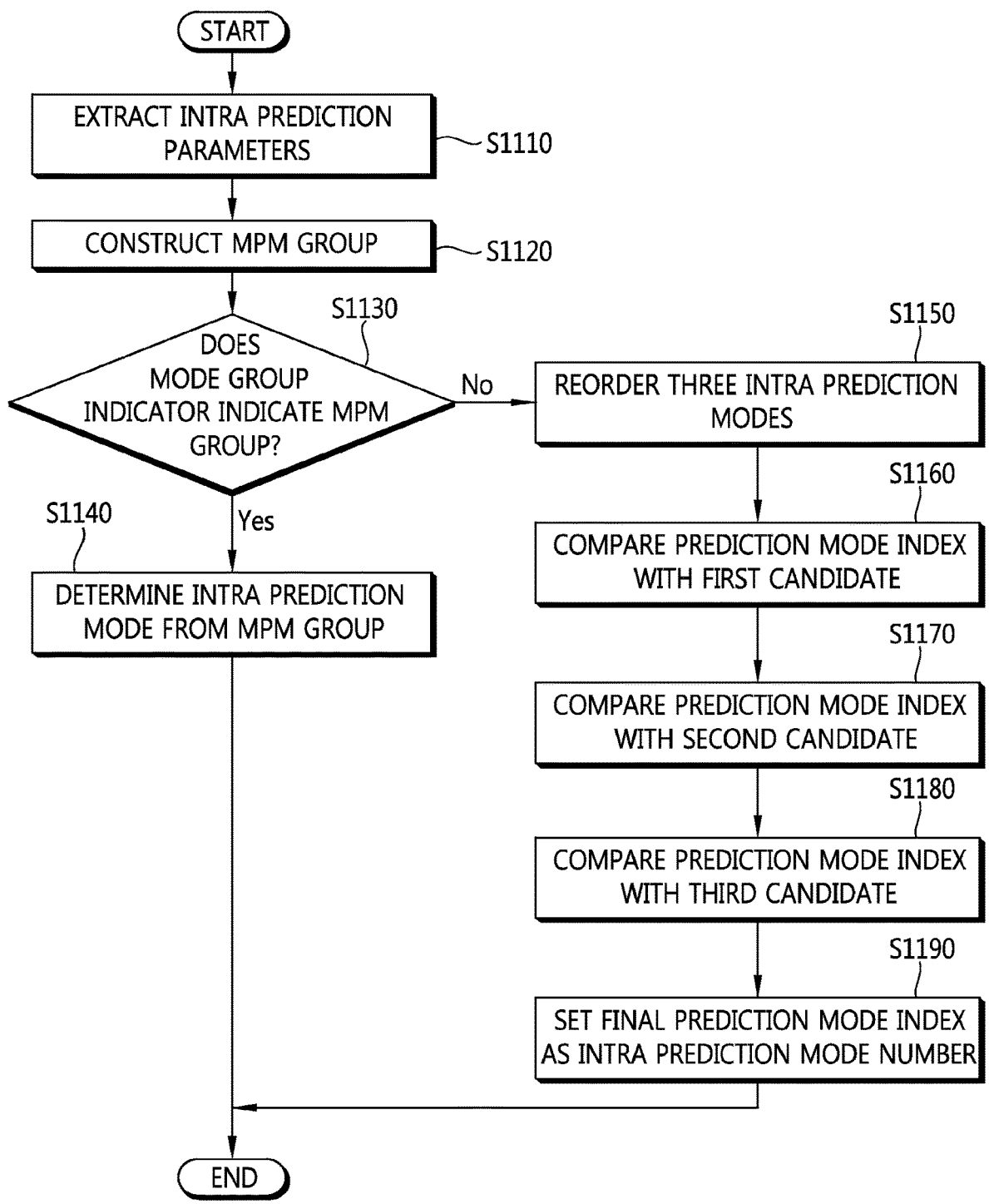
FIG. 4 is a flow chart illustrating a procedure of deriving an intra prediction mode of a current prediction unit according to the present invention.

FIG. 4 is a flow chart illustrating a procedure of deriving the intra prediction mode of the current prediction unit according to the present invention.

Intra prediction parameters of the current prediction unit are extracted from a received bit stream (S1110).

The intra prediction parameters include a mode group indicator and a prediction mode index. The mode group indicator is a flag indicating whether the intra prediction mode of the current prediction unit belongs to a most probable mode (MPM) group. If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes of the MPM group. The prediction mode index specifies the intro prediction mode of the current prediction unit within the group specified by the mode group indicator.

The MPM group is constructed using intra prediction modes of the neighboring prediction units (S1120). The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice or other tile, the intra prediction mode of the left or above neighboring unit is set as unavailable. If the left or above neighboring unit is inter-coded, the intra prediction mode of the left or above neighboring unit is set as unavailable. If the above neighboring unit is located within other LCU, the intra prediction mode of the left or above neighboring unit is set as unavailable.

Figure 5:
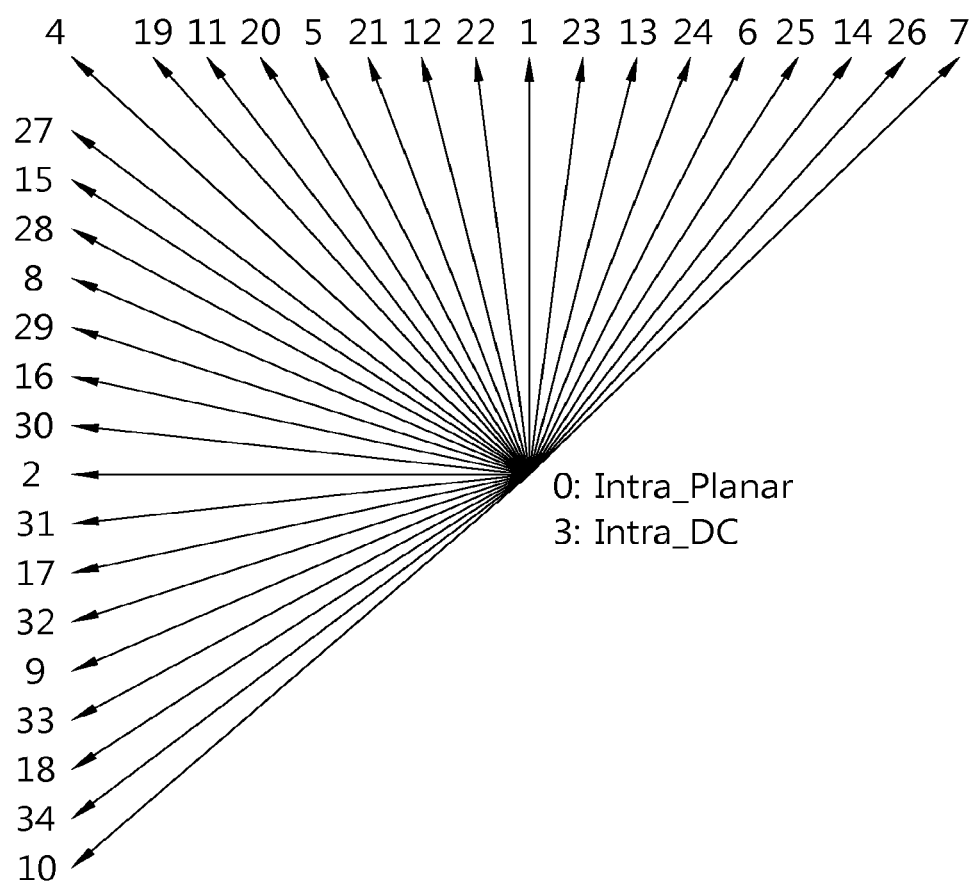
FIG. 5 is a conceptual diagram illustrating intra prediction modes according to the present invention.

FIG. 5 is a conceptual diagram illustrating intra prediction modes according to the present invention. As shown in FIG. 5, the number of intra prediction modes is 35. The DC mode and the planar mode are non-directional intra prediction modes and the others are directional intra prediction modes.

When both of the left intra prediction mode and the above intra prediction mode are available and are different each other, the left intra prediction mode and the above intra prediction mode are included in the MPM group and one additional intra prediction mode is added to the MPM group. Index 0 is assigned to one intra prediction mode of small mode number and index 1 is assigned to the other. Or index 0 is assigned to the left intra prediction mode and index 1 is assigned to the above intra prediction mode. The added intra prediction mode is determined by the left and above intra prediction modes as follows.

If one of the left and above intra prediction modes is a non-directional mode and the other is a directional mode, the other non-directional mode is added to the MPM group. For example, if the one of the left and above intra prediction modes is the DC mode, the planar mode is added to the MPM group. If the one of the left and above intra prediction modes is the planar mode, the DC mode is added to the MPM group. If both of the left and above intra prediction modes are non-directional modes, the vertical mode is added to the MPM group. If both of the left and above intra prediction modes are directional modes, the DC mode or the planar mode is added to the MPM group.

When only one of the left intra prediction mode and the above intra prediction mode is available, the available intra prediction mode is included in the MPM group and two additional intra prediction modes are added to the MPM group. The added two intra prediction modes are determined by the available intra prediction modes as follows.

If the available intra prediction mode is a non-directional mode, the other non-directional mode and the vertical mode are added to the MPM group. For example, if the available intra prediction mode is the DC mode, the planar mode and the vertical mode are added to the MPM group. If the available intra prediction mode is the planar mode, the DC mode and the vertical mode are added to the MPM group. If the available intra prediction mode is a directional mode, two non-directional modes (DC mode and planar mode) are added to the MPM group.

When both of the left intra prediction mode and the above intra prediction mode are available and are the same as each other, the available intra prediction mode is included in the MPM group and two additional intra prediction modes are added to the MPM group. The added two intra prediction modes are determined by the available intra prediction modes as follows.

If the available intra prediction mode is a directional mode, two neighboring directional modes are added to the MPM group. For example, if the available intra prediction mode is the mode 23, the left neighboring mode (mode 1) and the right neighboring mode (mode 13) are added to the MPM group. If the available intra prediction mode is the mode 30, the two neighboring modes (mode 2 and mode 16) are added to the MPM group. If the available intra prediction mode is a non-directional mode, the other non-directional mode and the vertical mode are added to the MPM group. For example, if the available intra prediction mode is the DC mode, the planar mode and the vertical mode are added to the MPM group.

When both of the left intra prediction mode and the above intra prediction mode are unavailable, three additional intra prediction modes are added to the MPM group. The three intra prediction modes are the DC mode, the planar mode and the vertical mode. Indexes 0, 1 and 2 are assigned to the three intra prediction modes in the order of the DC mode, the planar mode and the vertical mode or in the order of the planar mode, the DC mode and the vertical mode.

It is determined whether the mode group indicator indicates the MPM group (S1130).

If the mode group indicator indicates the MPM group, the intra prediction of the MPM group specified by the prediction mode index is set as the intra prediction mode of the current prediction unit (S1140).

If the mode group indicator does not indicate the MPM group, the three intra predictions of the MPM group are reordered in the mode number order (S1150). Among the three intra prediction modes of the MPM group, the intra prediction mode with lowest mode number is set to a first candidate, the intra prediction mode with middle mode number is set to a second candidate, and the intra prediction mode with highest mode number is set to a third candidate.

The prediction mode index is compared with the first candidate (S1160). If the prediction mode index is equal to or greater than the first candidate of the MPM group, the value of the prediction mode index is increased by one. Otherwise, the value of the prediction mode index is maintained.

The prediction mode index is compared with the second candidate (S1170). If the prediction mode index is equal to or greater than the second candidate of the MPM group, the value of the prediction mode index is increased by one. Otherwise, the value of the prediction mode index is maintained.

The prediction mode index is compared with the third candidate (S1180). If the prediction mode index is equal to or greater than the third candidate of the MPM group, the value of the prediction mode index is increased by one. Otherwise, the value of the prediction mode index is maintained.

The value of the final prediction mode index is set as the mode number of the intra prediction mode of the current prediction unit (S1190).

Next, a size of a current block is determined to generate a prediction block (S1200).

The size of the current block is equal to the size of the transform unit. The size of the current block is determined using the size of the prediction unit and transform size information. A prediction block and a residual block of the current block have same size of the transform unit. The transform size information includes one or more split_tu_flags used for indicating the split structure.

If the size of the transform unit is equal to the size of the current prediction unit, the current prediction unit is set as the current block.

If the size of the transform unit is smaller than the size of the current prediction unit, the prediction unit is comprised of a plurality of sub-blocks. Each sub-block is set as the current block. In this case, the steps S1300, S1400 and S1500 are performed for the first sub-block of the prediction unit. Then, the steps S1300, S1400 and S1500 are repeatedly performed for the remaining sub-blocks of the prediction unit in decoding order. Same intra prediction mode is used for all the sub-blocks within the prediction unit.

Next, a prediction block is generated according to the intra prediction mode (S1300).

Figure 6:
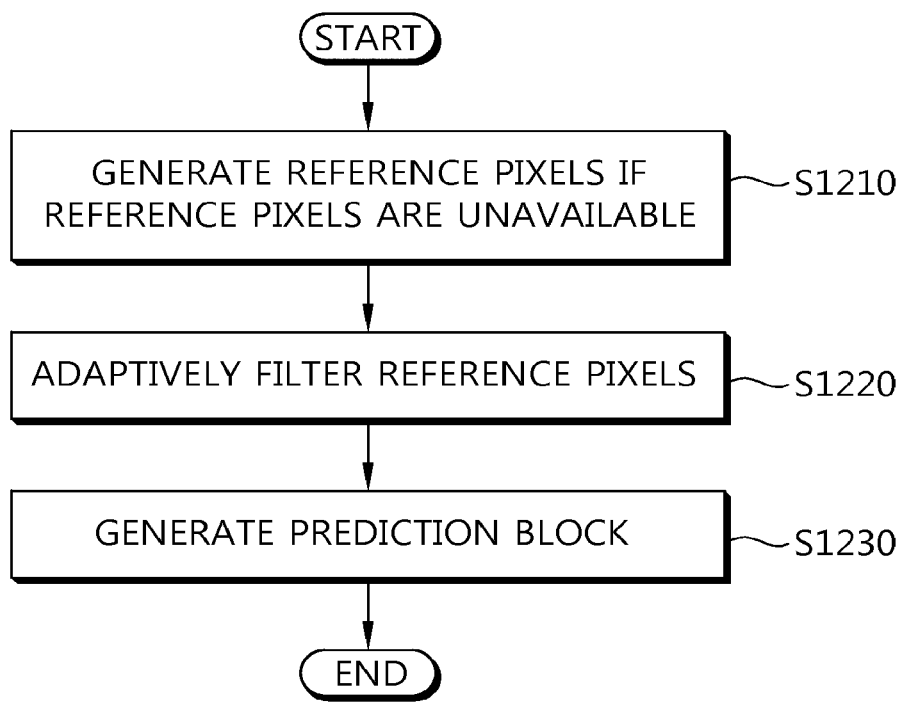
FIG. 6 is a flow chart illustrating a procedure of generating a prediction block according to the present invention.

FIG. 6 is a flow chart illustrating a procedure of generating the prediction block according to the present invention.

It is determined whether all reference pixels of the current block are available, and reference pixels are generated if one or more reference pixels are unavailable (S210). The current block is the current prediction unit or the sub-block of the current prediction unit. The size of the current block is the size of the transform unit.

Figure 7:
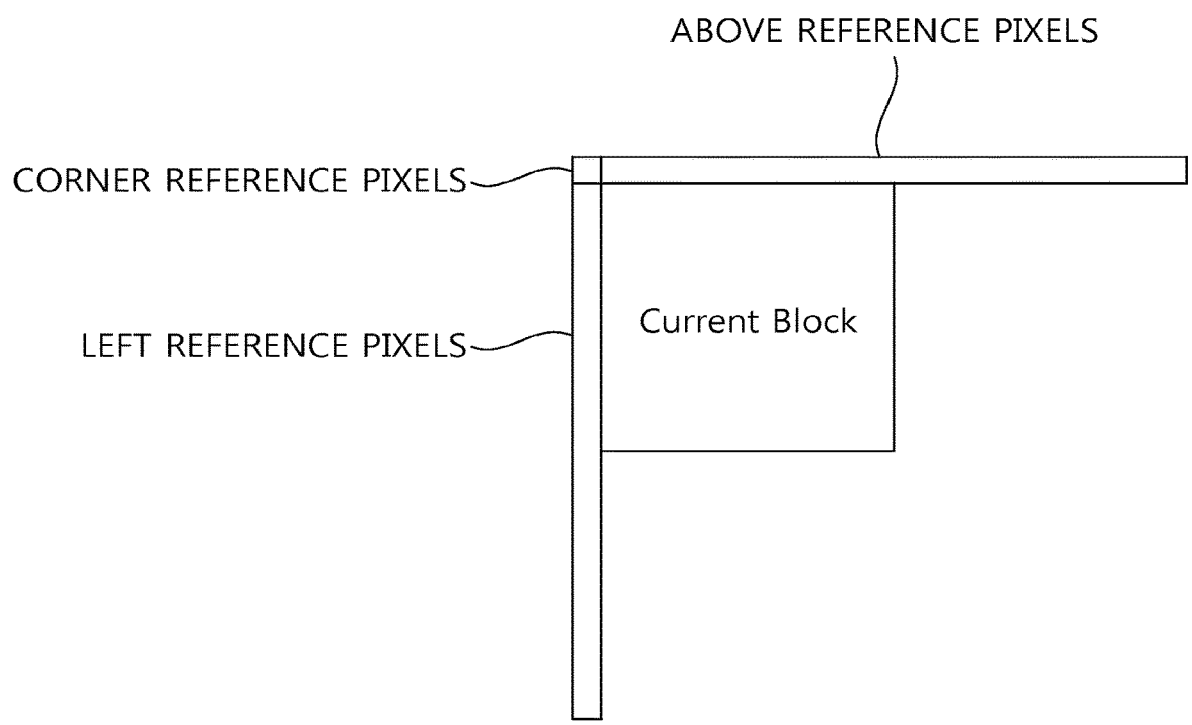
FIG. 7 is a conceptual diagram illustrating positions of reference pixels of a current block according to the present invention.

FIG. 7 is a conceptual diagram illustrating positions of reference pixels of the current block according to the present invention. As shown in FIG. 7, the reference pixels of the current blocks are comprised of above reference pixels located at (x=0, . . . , 2N−1, y=−1), left reference pixels located at (x=1−, y=0, . . . , 2M−1) and a corner pixel located at (x=−1, y=−1). N is the width of the current block and M is the height of the current block.

If one or more reference pixels are unavailable, one or more reference pixels are generated as follows.

If all reference pixels are unavailable, a constant value is substituted for the values of all the reference pixels. The constant value is $2^{L-1}$, and the value of L, is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the value of the reference pixel nearest to the unavailable pixel in a predetermined direction is substituted for each unavailable reference pixel.

The reference pixels are adaptively filtered based on the intra prediction mode and the size of the current block (S1220). The size of the current block is the size of the transform unit.

In the DC mode, the reference pixels are not filtered, in the vertical mode and the horizontal mode, the reference pixels are not filtered. In the directional modes other than the vertical and horizontal modes, the reference pixels are adaptively according to the size of the current block.

If the size of the current block is 4×4, the reference pixels are not filtered in all intra prediction modes. For the size 8×8, 16×16 and 32×32, the number of intra prediction mode where the reference pixels are filtered increases as the size of the current block becomes larger.

A prediction block of the current block is generated using the reference pixels according to the restored intra prediction mode (S1230).

In the DC mode, the prediction pixels are generated by copying average value of the N reference pixels located at (x=0, . . . N−1, y=−1) and the M reference pixels located at (x=−1, y=0, . . . , M−1). The prediction pixel adjacent to the reference pixel is filtered by one or two adjacent reference pixels.

In the vertical mode, the prediction pixels are generated by copying the value of the vertical corresponding reference pixel. The prediction pixels adjacent to the left reference pixel are filtered using the corner pixel and the left neighboring pixel.

In the horizontal mode, the prediction pixels are generated by copying the value of the horizontal corresponding reference pixel. The prediction pixels adjacent to the above reference pixel are filtered using the corner pixel and the upper neighboring pixel.

Next, a residual block is generated according to the intra prediction mode (S1400).

Figure 8:
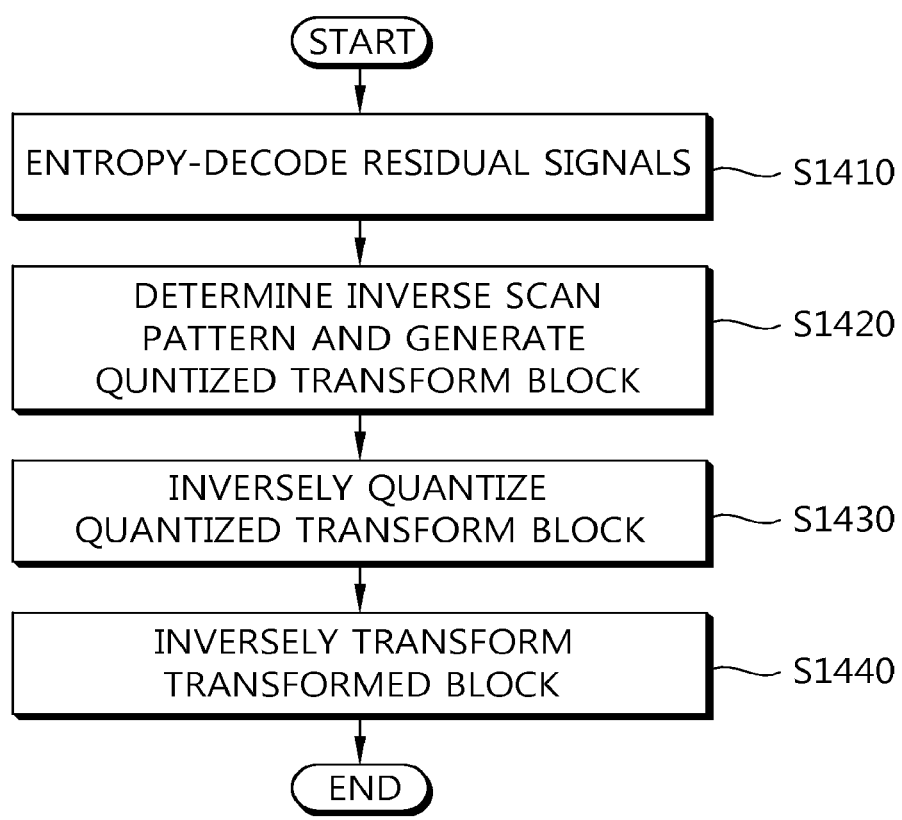
FIG. 8 is a flow chart illustrating a procedure of generating a residual block according to the present invention.

FIG. 8 is a flow chart illustrating a procedure of generating the residual block according to the present invention.

The encoded residual signals are entropy-decoded to generate quantized coefficient information (S1410). When CABAC is used for entropy coding, the coefficients information includes significant flags, coefficient signs and coefficient levels. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

An inverse scan pattern is determined and a quantized block is generated according the inverse scan pattern (S1420). The step is performed by the inverse scanning unit 220 of FIG. 2. Therefore, the same operation of the inverse scanning unit 220 is performed to determine the inverse scan pattern and to generate the quantized block.

The quantized block is inversely quantized using a quantization parameter (S1430).

Figure 9:
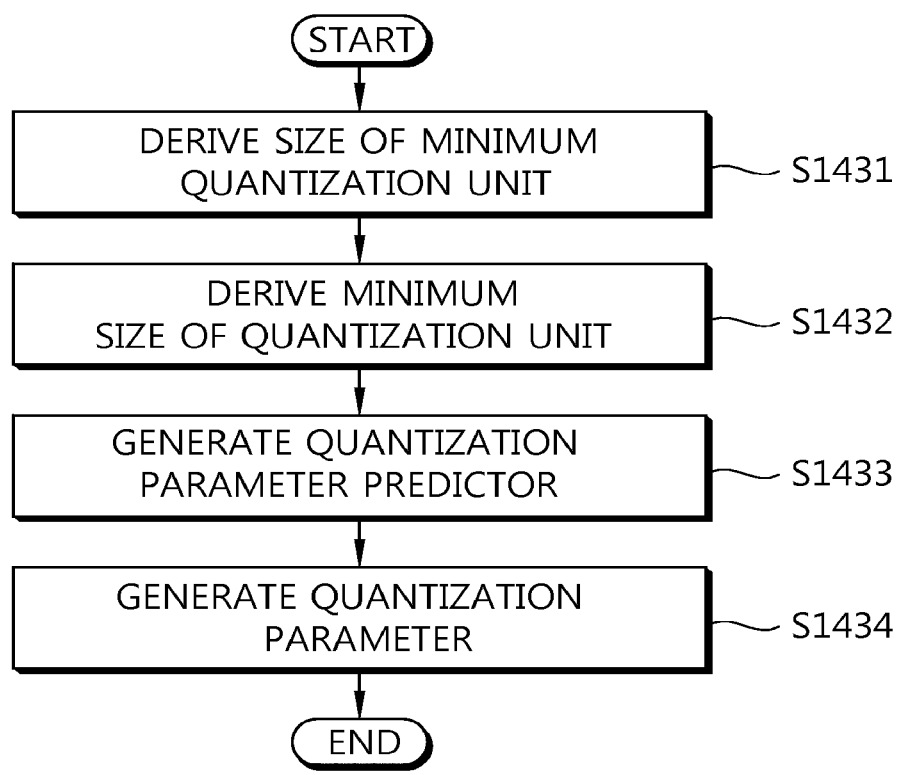
FIG. 9 is a flow chart illustrating a procedure of deriving quantization parameter according to the present invention.

FIG. 9 is a flow chart illustrating a procedure of deriving quantization, parameter according to the present invention.

A minimum size of the quantization unit is derived (S1431). The minimum size of the quantization unit is equal to a size of LCU or a size of sub-block of LCU. The minimum size of the quantization unit is determined per picture. A parameter (cu_qp_delta_enabled_info) specifying the depth of the minimum size of the quantization unit is extracted from PPS. The minimum size of the quantization unit is derived as following equation:

Log 2(MinQUSize)=Log 2(MaxCUSize)−cu_qp_delta_enabled_info

The MinQUSize is the minimum size of the quantization unit. The MaxCUSize is the size of LCU. Only one parameter is used for deriving the minimum size of the quantization unit.

A differential quantization parameter (dQP) of the current coding unit is restored (S1432). The dQP is restored per quantization unit. For example, if the size of the current coding unit is equal to or larger than the minimum size of the quantization unit, the dQP is restored for the current coding unit, if the current coding unit does not contain an encoded dQP, the dQP is set to zero. If the quantization unit includes plural coding units, a first coding unit containing the dQP and the following coding unit within the quantization unit have same dQP.

The encoded dQP is arithmetically decoded to generate a bin string, and the bin string is converted into the dQP. The bin string comprises a bin for indicating the dQP is zero or not. When the dQP is not zero, the bin string further comprises a bin for sign of the dQP, and a bin string for indicating absolute value of the dQP.

A quantization parameter predictor of the current coding unit is generated (S1433). The quantization parameter predictor is generated using the same operation of the inverse quantization unit 230 of FIG. 2.

If the quantization unit includes plural coding units, the quantization parameter predictor of the first coding unit in the decoding order is generated, and the generated quantization parameter predictor is used for all the coding units within the quantization unit.

The quantization parameter is generated using the dQP and the quantization parameter predictor (S1434).

Meanwhile, the user-defined quantization matrices are also restored. A set of the user-defined quantization matrices is received from the encoding apparatus through the SPS or the PPS. The user-defined quantization matrix is restored using inverse DPCM. The diagonal scan is used for the DPCM. When the size of the user-defined quantization matrix is larger than 8×8, the user-defined quantization matrix is restored by up-sampling the coefficients of the received 8×8 quantization matrix. The DC coefficient of the user-defined quantization matrix is extracted from the SPS or the PPS. For example, if the size of the user-defined quantization matrix is 16×16, coefficients of the received 8×8 quantization matrix are up-sampled using 1:4 up-sampling.

A residual block is generated by inversely transforming the inverse-quantized block (S1440). An inverse transform type is adaptively determined according to the prediction mode and the size of the transform unit. The inverse transform type is the DCT-based integer transform or the DST-based integer transform. In intra prediction mode, if the size of the transform unit is smaller than a predetermined size, the DST-based integer transforms are used, otherwise the DCT-based integer transforms are used.

Next, a reconstructed block is generated by adding the prediction block and the residual block (S1500).

Figure 10:
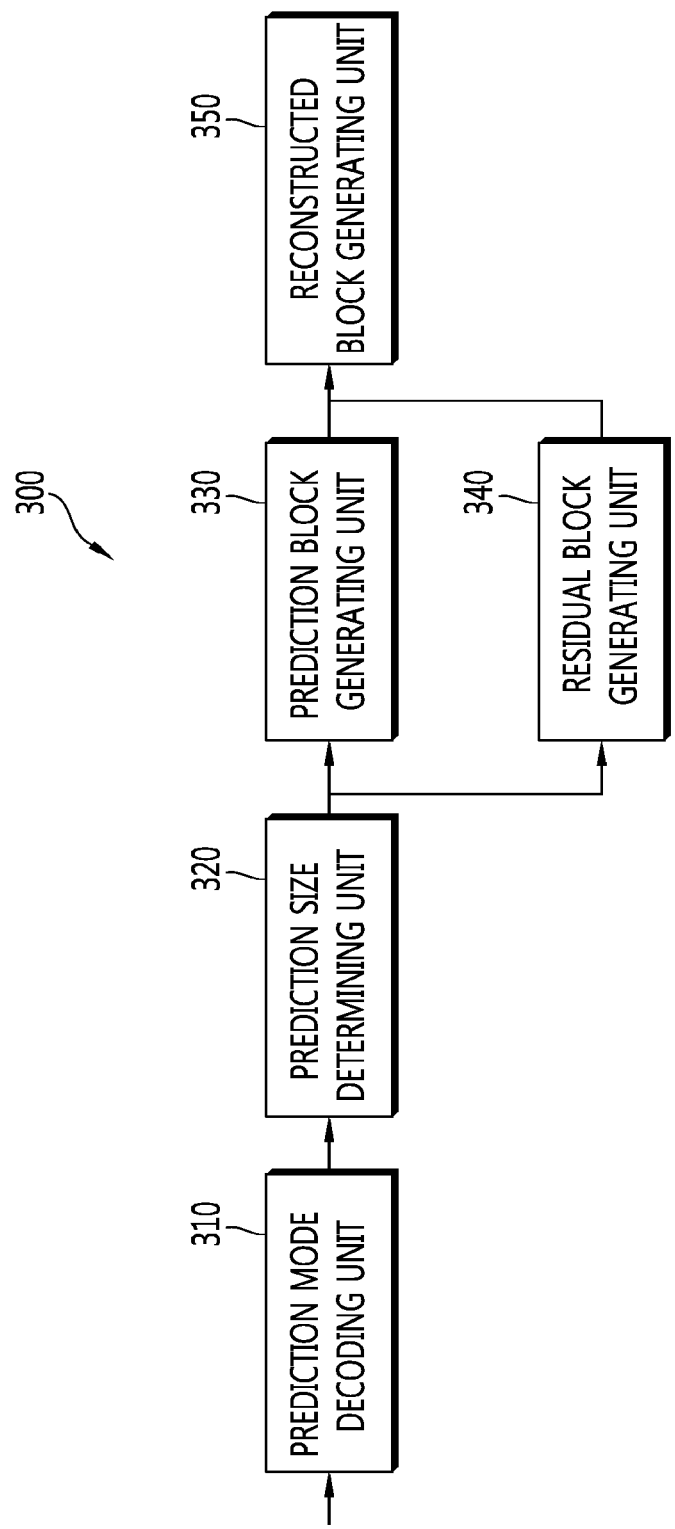
FIG. 10 is a block diagram illustrating an apparatus of generating a reconstructed block according to the present invention.

FIG. 10 is a block diagram illustrating an apparatus 300 of generating a reconstructed block according to the present invention.

As shown in FIG. 10, the apparatus 300 according to the present invention includes a prediction mode decoding unit 310, a prediction size determining unit 320, a prediction block generating unit 330, a residual block generating unit 340 and a reconstructed block generating unit 350.

The prediction mode decoding unit 310 derives the intra prediction mode of the current prediction unit. The prediction mode decoding unit 310 performs the same procedure of FIG. 4 to derive the intra prediction mode.

The prediction size determining unit 320 determines the size of the current block using the size of the current prediction unit and the transform size information. The size of the current block is equal to the size of the transform unit. A prediction block and a residual block of the current block have same size of the transform unit. The current prediction unit or a sub-block of the current prediction unit is set as the current block based on the transform size information.

The prediction block generating unit 330 generates the prediction block of the current block using the intra prediction mode. The prediction block generating unit 330 includes a reference pixel generator, a reference pixel filter and a prediction block generator.

The reference pixel generator generates reference pixels if one or more reference pixels of the current block are unavailable. If all reference pixels are unavailable, the value of $2^{L-1}$ is substituted for the values of all the reference pixels. The value of L is the number of bits used to represent luminance pixel value. If available reference pixels are located at only one side of the unavailable reference pixel, the value of the reference pixel nearest to the unavailable pixel is substituted for the unavailable reference pixel. If available reference pixels are located at both sides of the unavailable reference pixel, the value of the reference pixel nearest to the unavailable pixel in a predetermined direction is substituted for each unavailable reference pixel.

The reference pixel filter adaptively filters the reference pixels based on the intra prediction mode and the size of the transform unit.

In the DC mode, the reference pixels are not filtered. In the vertical mode and the horizontal mode, the reference pixels are not filtered. In the directional modes other than the vertical and horizontal modes, the reference pixels are adaptively according to the size of the current block.

If the size of the current block is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number is one of 0~7 and decreases as the size of the current block increases.

The prediction block generator generates a prediction block of the current block using the reference pixels according to the intra prediction mode.

In the DC mode, the prediction pixels are generated by copying average value of the N reference pixels located at (x=0, ... N−1, y=−1) and the M reference pixels located at (x=−1, y=0, ... M−1). The prediction pixel adjacent to the reference pixel is filtered by one or two adjacent reference pixels.

In the vertical mode, the prediction pixels are generated by copying the value of the vertical reference pixel. The prediction pixels adjacent to the left reference pixel are filtered using the corner reference pixel and the left neighboring reference pixel.

In the horizontal mode, the prediction pixels are generated by copying the value of the horizontal reference pixel. The prediction pixels adjacent to the above reference pixel are filtered using the corner reference pixel and the above neighboring reference pixel.

The residual block generating unit 340 generates the residual block of the current block using the intra prediction mode. The same procedure of FIG. 8 is performed by the residual block generating unit 340.

The reconstructed block generating unit 350 adds the prediction block and the residual block to generate the reconstructed block of the current block.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for encoding an image in intra prediction, comprising:
    an intra prediction unit generating a prediction block using an intra prediction mode;
    a transform unit transforming residual signals generated using an original block and the prediction block to generate a transformed block;
    a quantization unit determining a quantization parameter and quantizing the transformed block using a quantization matrix and the quantization parameter to generate a quantized block;
    a scanning unit determining a scan pattern and applying the scan pattern to the quantized block to generate one-dimensional coefficient information; and
    an entropy coding unit entropy-coding the one-dimensional coefficient information and the intra prediction mode,
    wherein the residual signals are transformed in transform unit, DST-based integer transforms are used for transforming the residual signals if the size of the transform unit is smaller than a predetermined size, and DCT-based transforms are used if the size of the transform unit is equal to or larger than the predetermined size,
    wherein a differential quantization parameter is generated by subtracting a quantization parameter predictor from the quantization parameter, and is entropy-coded, and
    wherein if two or more quantization parameters are available among a left quantization parameter, an above quantization parameter and a previous quantization parameter of a current coding unit, the quantization parameter predictor is generated using first two available quantization parameters among the left quantization parameter, the above quantization parameter and the previous quantization parameter, and if only one quantization parameter is available, the available quantization parameter is set as the quantization parameter predictor.

2. The apparatus of claim 1, wherein if the left and above quantization parameters are available, an average of the left and above quantization parameters is set as the quantization parameter predictor.

3. The apparatus of claim 1, wherein if only one of the left and above quantization parameters is available, the average of the available quantization parameter and the previous quantization parameter is set as the quantization parameter predictor.

4. The apparatus of claim 1, wherein the quantization parameter is generated per quantization unit, and a minimum size of the quantization unit is adjusted per picture.

5. The apparatus of claim 1, wherein if the size of the transform unit is equal to or smaller than 8×8, the scan pattern is determined among a diagonal scan, a vertical scan and a horizontal scan based on the intra prediction mode.

6. The apparatus of claim 1, wherein if the size of the transform unit is larger than 8×8, the scan pattern is a diagonal scan.

7. The apparatus of claim 1, wherein if the size of the transform unit is larger than a predetermined size, the quantized block is divided into plural subsets and the scan pattern is applied to significant flags, coefficient signs and coefficient levels of each subset.

8. The apparatus of claim 7, wherein the subsets are scanned according to the scan pattern applied to the significant flags, the coefficient signs and the coefficient levels.

* * * * *